C. V. POLLOCK.
ENGINE CRANKING DEVICE.
APPLICATION FILED JUNE 22, 1910.
986,311.
Patented Mar. 7, 1911.
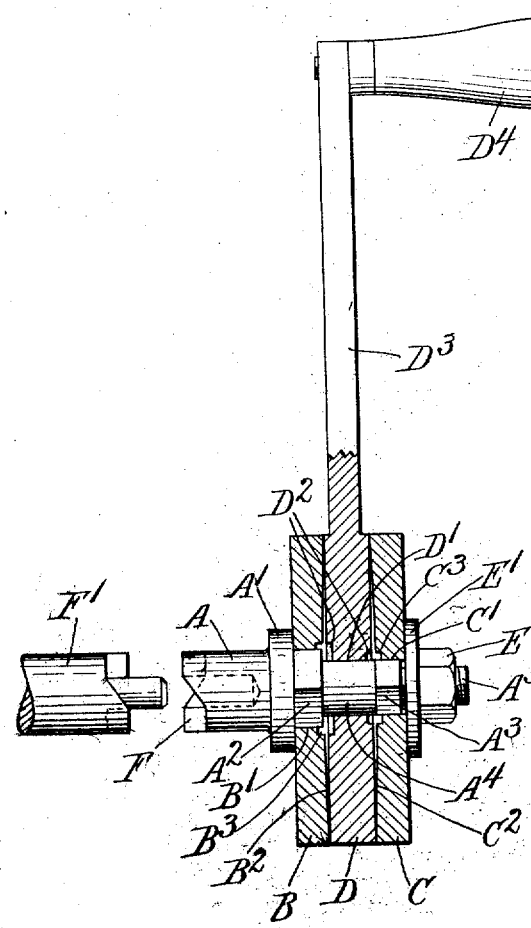
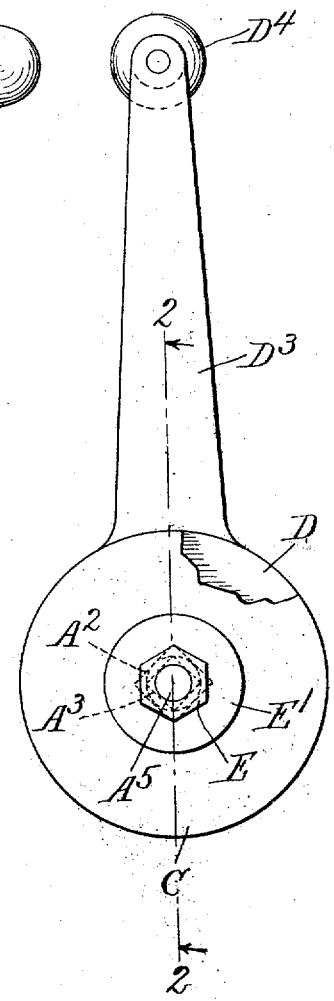
Witnesses.
Edward T. Wray
Sophie B. Werner
Inventor.
Charles V. Pollock
by Parker Carter
Attorneys.

UNITED STATES PATENT OFFICE.

CHARLES VERTREESE POLLOCK, OF MADISON, WISCONSIN.

ENGINE-CRANKING DEVICE.

986,311.  Specification of Letters Patent.  Patented Mar. 7, 1911.

Application filed June 22, 1910. Serial No. 568,244.

*To all whom it may concern:*

Be it known that I, CHARLES V. POLLOCK, a citizen of the United States, residing at Madison, in the county of Dane and State of Wisconsin, have invented a certain new and useful Improvement in Engine-Cranking Devices, of which the following is a specification.

My invention relates to improvements in engine cranking devices and has for its object to provide a new and improved device whereby the engine might be cranked but which will release in case of a premature explosion in the engine cylinder.

Figure 1 is a front elevation of the crank: Fig. 2 is a part section on the line 2—2 of Fig. 1.

Like parts are indicated by like letters throughout the several figures.

The shaft $A$ having the collar $A^1$ integral therewith has the squared portions $A^2$, $A^3$, and the cylindrical portion $A^4$ and terminates in the screw-threaded part $A^5$. The disk $B$ has the centrally located square hole $B^1$ to engage the part $A^2$ and the concave surface $B^2$ extending from the periphery of the disk to the depression $B^3$ about the hole $B^1$. The disk $C$ has the square hole $C^1$ to engage the part $A^3$ and concave surface $C^2$ extending from the periphery of the disk to the centrally located depression $C^3$. The flat disk $D$ provided with the circular hole $D^1$ to engage the part $A^4$, is provided on either side with the depressions $D^2$, and has projecting therefrom the arm $D^3$ upon which is mounted the handle $D^4$. The nut $E$ engages the screw-thread $A^5$ to compress the disks $B$, $C$ and $D$ between the washer $E^1$ and collar $A^1$.

The shaft $A$ is provided at one end with the clutch $F$ which is adapted to engage the end of the engine shaft $F^1$ when the crank is rotated to start the engine.

The use and operation of my invention are as follows: Upon the engine shaft I mount a plurality of concaved disks in such manner that they are rotated positively thereby. Between these disks I place a further flat disk which is rotatably mounted upon the shaft. This disk is provided with an arm and handle and by adjusting by means of a nut or other mechanism, the pressure between the concaved disks which rotate with the shaft and the flat disk which does not rotate, a suitable connection may be had between the engine and the crank in order that the engine may be turned by means of the crank but that the crank may slip in case a premature explosion should reverse the engine. I provide concaved disks since I find that the pressure required is less and the friction is applied near the periphery of the disk rather than near the shaft where the mechanical leverage is smaller.

I claim:—

1. An engine cranking device comprising a hand-held operating portion, in combination with an engine rod driving portion and slidable concave disk connections between them.

2. An engine cranking device comprising a hand-held portion, in combination with an engine rod driving portion having concave friction disks thereon forming a slidable connection between them.

3. An engine cranking device comprising a hand-held portion, consisting of a hand portion with a disk, in combination with an engine rod driving portion, slidable connections between them, comprising concave friction disks.

4. An engine cranking device comprising a shaft, a flat hand-operated disk rotatably mounted upon said shaft and concave disks in frictional engagement with said flat disk.

5. An engine cranking device comprising a shaft, a flat hand-operated disk rotatably mounted upon said shaft and concave disks in frictional engagement with said flat disk, said disks rigidly mounted upon said shaft.

6. An engine cranking device comprising a shaft, a flat hand-operated disk rotatably mounted upon said shaft and concave disks in frictional engagement with said flat disk, and means for adjusting the friction between said disks.

7. An engine cranking device comprising a shaft, a flat hand-operated disk rotatably mounted upon said shaft and concave disks in frictional engagement with said flat disk, said disks rigidly mounted upon said shaft and means for adjusting the friction between said disks.

8. An engine cranking device comprising a shaft, a flat hand-operated disk rotatably mounted upon said shaft and concave disks in frictional engagement with said flat disk, said disks provided with centrally located openings angular in cross section to engage corresponding portions of the shaft.

9. An engine cranking device comprising a shaft, a flat hand-operated disk rotatably mounted upon said shaft and concave disks in frictional engagement with said flat disk, said disks centrally perforated, said perforations being square in cross section and adapted to engage corresponding square surfaces upon the shaft.

CHARLES VERTREESE POLLOCK.

Witnesses:
  CHARLES G. RILEY,
  ISABELLE FLECKENSTEIN.